United States Patent
Bellman et al.

(10) Patent No.: US 6,403,286 B1
(45) Date of Patent: Jun. 11, 2002

(54) HIGH ASPECT RATIO PATTERNING OF GLASS FILM

(75) Inventors: Robert A. Bellman; Ljerka Ukrainczyk, both of Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/433,215

(22) Filed: Nov. 4, 1999

(51) Int. Cl.[7] .............................. G03C 5/56; G03C 8/02
(52) U.S. Cl. ..................... 430/313; 430/314; 430/311; 430/321; 430/330
(58) Field of Search ................... 430/311–330

(56) References Cited

U.S. PATENT DOCUMENTS

| | | | |
|---|---|---|---|
| 2,628,160 A | 2/1953 | Stookey | 216/87 |
| 2,971,853 A | 2/1961 | Stookey | 501/4 |
| 3,615,318 A | 10/1971 | Jagodzinski et al. | 65/30.1 |
| 4,209,229 A | * 6/1980 | Rittler | 350/96.34 |
| 4,328,305 A | 5/1982 | Rauscher | 430/351 |
| 4,480,044 A | 10/1984 | McAlinn | 501/4 |
| 4,526,785 A | * 7/1985 | Trotter, Jr. | 428/209 |
| 5,037,776 A | 8/1991 | Galeuchet et al. | 438/504 |
| 5,062,877 A | 11/1991 | Borrelli et al. | 65/30.13 |
| 5,170,455 A | 12/1992 | Goossen et al. | 385/89 |
| 5,322,538 A | 6/1994 | Kondo et al. | 65/31 |
| 5,374,291 A | 12/1994 | Yabe et al. | 65/30.11 |
| 5,512,131 A | 4/1996 | Kumar et al. | 438/738 |
| 5,613,995 A | 3/1997 | Bhandarkar et al. | 65/384 |
| 5,637,126 A | 6/1997 | Ema et al. | 65/384 |
| 5,900,160 A | 5/1999 | Whitesides et al. | 216/41 |
| 5,904,566 A | 5/1999 | Tao et al. | 438/689 |
| 5,945,238 A | 8/1999 | Huggins et al. | 216/41 |

FOREIGN PATENT DOCUMENTS

| | | |
|---|---|---|
| DE | 19846751 | 6/1999 |
| EP | 0676384 | 10/1995 |

* cited by examiner

Primary Examiner—Mark F. Huff
Assistant Examiner—Deborah Chacko-Davis
(74) Attorney, Agent, or Firm—Price, Heneveld, Cooper, DeWitt & Lition

(57) ABSTRACT

A relatively facile, inexpensive method for patterning a layer of glass or a substrate involves patterning a seed material containing a nucleating agent adjacent a layer of thermally crystallizable glass and heart treating the seed material and the layer of thermally crystallizable glass to induce highly oriented crystal growth from the seed material through the thickness of the thermally crystallizable glass layer at selected portions thereof. After the heart treatment, the layer of thermally crystallizable glass is converted into a desired pattern of glass surrounded by crystalline material. The crystalline material is removed with an etchant to leave a desired glass pattern.

10 Claims, 4 Drawing Sheets

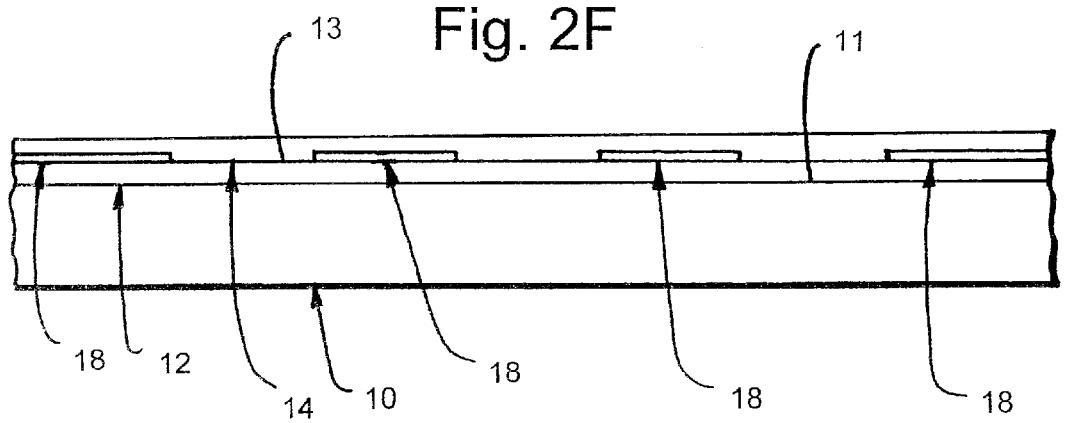
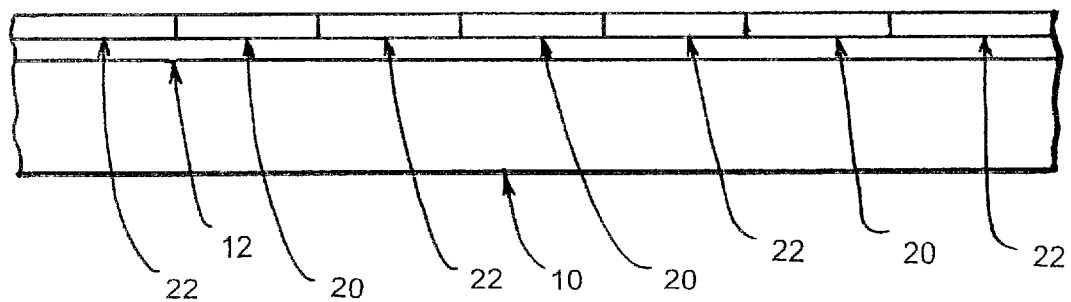

HIGH ASPECT RATIO PATTERNING OF GLASS FILM

BACKGROUND OF THE INVENTION

1. Field of the Invention

The present invention relates to the field of forming glass patterns on a substrate, and more particularly to precise patterning of thin glass films for planar optical devices.

2. Technical Background

Structures incorporating patterned glass films are utilized in planar optical devices, dielectric layers in semiconductors, barrier structures in plasma-addressed electro-optic display panels (commonly referred to as "PALC" display devices), biochemical sensors, and other devices. The lack of anisotropic etching makes patterning of glass thin film structures difficult. For example, planar optical structures compatible with optical fiber based technology require deposition and patterning of relatively thick (e.g., from about 5 to about 8 micrometers) films of uniform thickness with precisely defined sidewall geometry to form planar waveguides. Currently, these planar optical devices are typically patterned by either dry etching or ion-exchange. Dry etching is slow and expensive, and waveguides prepared using ion-exchange techniques are typically anisotropic in shape which leads to optical polarization dependence.

Photosensitive lithium silicate, barium silicate, and lithium barium silicate glasses which contain nucleation agents such as Ag and $CeO_2$ and sensitizers such as F, permit chemical machining of glass structures. Irradiation with UV, X-rays, or an electron beam produces noble metal nuclei which serve as sites for epitaxial growth of needle-like lithium disilicate or barium disilicate crystals upon heat treatment. In the case of lithium silicates, chemical machining of highly anisotropic structures is possible because the etch rate in dilute HF is 10 to 50 times greater in the crystalline phase compared to the remaining glass. However, conventional techniques of patterning photosensitive glasses are not suitable for submicron scale patterning in planar applications because the size of the lithium or barium disilicate is typically about 5 microns in the longest dimension.

Accordingly, relatively facile and less expensive techniques of forming patterned glass films having submicron features are highly desired.

SUMMARY OF THE INVENTION

This invention provides a relatively facile and relatively inexpensive method of precisely patterning glass films having submicron size features and resulting product.

The method of forming a glass pattern on a substrate in accordance with the present invention involves the steps of depositing a layer of a crystallizable glass on a substrate, and forming a patterned seed layer including a nucleating agent on a major planar surface of the crystallizable glass. The patterned seed layer may be formed on the substrate first, and the layer or crystallizable glass may be subsequently deposited over the patterned seed layer and exposed portions of the substrate which are not covered with the patterned seed layer. Alternatively, the layer of crystallizable glass may be deposited on the substrate first, and the patterned seed layer may be subsequently formed on the layer of crystallizable glass. Thereafter, the patterned seed layer and the layer of crystallizable glass are heat treated to convert selected portions of the crystallizable layer of glass into a crystalline material. The selected portions of the crystallizable layer which are converted to crystalline material correspond to the pattern of the seed layer. Thereafter, the crystalline material is etched to form a desired glass pattern.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

BRIEF DESCRIPTION OF THE DRAWINGS

FIGS. 2A–2G schematically illustrate structures formed at various stages of a method in accordance with another aspect of the invention for forming a patterned glass layer on a substrate, and, more particularly, for forming a patterned glass waveguide core for an optical device.

DETAILED DESCRIPTION OF THE PREFERRED EMBODIMENT

In accordance with an embodiment of the invention, a planar optical device comprising a patterned waveguide core disposed between cladding layers is made by depositing a layer of a thermally crystallizable glass on a substrate coated with an undercladding layer, selectively crystallizing portions of the thermally crystallizable glass, removing the selectively crystallized portions with an etchant to form a patterned waveguide core, and depositing an overcladding layer over the patterned waveguide core.

Figure 1A:
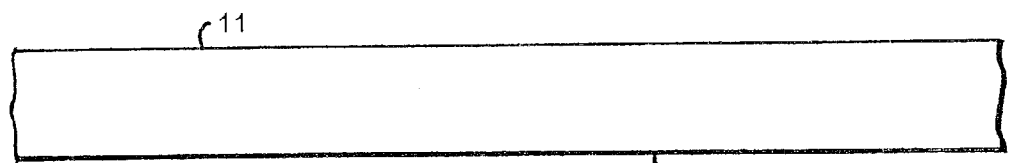
FIGS. 1A–1J schematically illustrate structures formed at various stages of a method in accordance with an aspect of the invention for forming a patterned glass layer on a substrate, and, in particular, for forming a patterned waveguide core for an optical device.

The first step is to provide a substrate 10 as shown in FIG. 1A. Substrate 10 may be a semiconductor, such as a monocrystalline silicon, a ceramic or glass. However, the expression "substrate" as used in the claims is meant to encompass generally any solid material having a surface on which a layer of glass may be patterned in accordance with the methods of the invention.

Figure 1B:
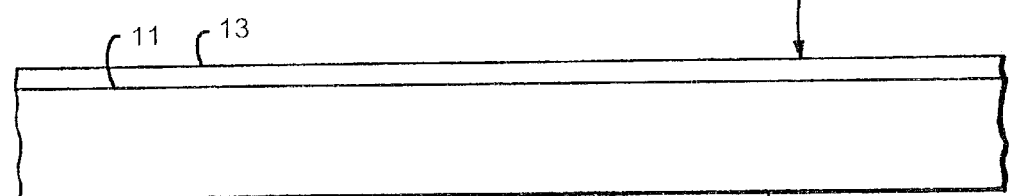

The next step is to apply to a major surface 11 of substrate 10 a layer 12 of undercladding glass. The resulting structure is shown in FIG. 1B. For a silicon substrate, undercladding layer 12 may be, for example, a high silica glass applied while subjecting the substrate to oxygen at elevated pressure and temperature. A suitable thickness for undercladding layer 12 is from about 10 to about 20 micrometers. A layer of the same glass used for layer 12 may be applied to the major surface of substrate 10 opposite the surface to which layer 12 is applied in order to prevent warping of the substrate from thermal mismatch. Undercladding layer 12 preferably has a coefficient of thermal expansion approximately equal to or lower than that of substrate 10. Undercladding layer 12 is selected so that it has an index of refraction which is less than that of the material which will be used to form a waveguide core. Typically, the undercladding material has an index of refraction which is from about 0.5% to about 1% less than that of the waveguide core. Other known techniques which may be employed for depositing undercladding layer 12 on substrate 10 include plasma enhanced chemical vapor deposition (PECVD); low pressure chemical vapor deposition (LPCVD); atmospheric pressure chemical vapor deposition (APCVD); flame hydrolysis deposition (FHD), and physical vapor deposition (PVD).

As an alternative, substrate 10 may itself be comprised of undercladding glass, in which case the step of depositing an undercladding layer is not required.

Figure 1C:
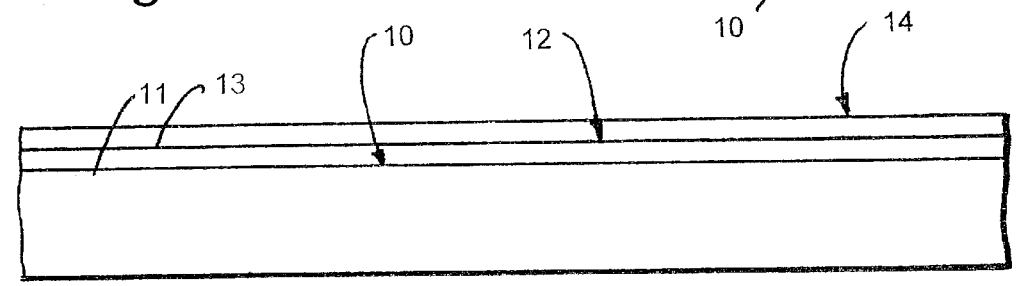

In accordance with this embodiment of the invention, the next step is to deposit on surface 13 of undercladding layer 12 a layer 14 of a thermally crystallizable glass. The resulting structure is shown in FIG. 1C. Thermally crystallizable glass include materials referred to as photosensitive glass, photosensitive ceramic, and photosensitively opacifible glass. Photothermally crystallizable materials are glass or ceramic materials which upon being sequentially subjected to ultraviolet radiation and heat treatment will develop crystals in situ. The developed crystals are much more soluble in aqueous hydrofluoric acid than the glass from which the crystals are developed. Examples of suitable crystallizable glasses include lithium silicate, barium silicate, and lithium barium silicate glasses. Examples of commercially available photosensitive glass and ceramic materials include materials manufactured by Corning Incorporated under the trademarks "FOTOFORM®" and "FOTOCERAM®". Photosensitive glass and ceramic materials, such as those that which are commercially available, may be suitable for use in accordance with certain aspects of this invention. However, in accordance with certain aspects of this invention, preferred thermally crystallizable glass materials are materials which are similar to the commercially available photothermally crystallizable glasses, but which do not contain a nucleating agent such as Ag or $CeO_2$. The use of thermally crystallizable glasses which are not photothermally crystallizable permits oriented crystal growth of the thermally crystallizable glass from a major planar surface in the direction of the thickness of the layer of thermally crystallizable glass.

The layer of photothermally crystallizable glass which is deposited on substrate 10 or undercladding layer 12 may have any thickness which is suitable for a waveguide core. Typically, the thickness of layer 14 is from about 3 to about 10 micrometers, and more typically from about 5 to about 7 micrometers. Suitable thicknesses for a waveguide core are dependent on the refractive indices of the cladding and waveguide core. In general, thicker waveguide cores are needed as the difference between the index of refraction of the waveguide core and the index of refraction of the cladding decreases. For telecommunications applications, the thickness of the waveguide core, and therefore the thickness of layer 14 of thermally crystallizable glass, is about equal to the typical diameter of an optical fiber, e.g., from about 6.0 to about 6.5 micrometers. Layer 14 of thermally crystallizable glass may be applied to substrate 10 or undercladding layer 12 using generally any of the known techniques which may be used for depositing undercladding layer 12 on substrate 10, e.g., PECVD, LPCVD, APCVD, FHD or PVD.

Figure 1D:
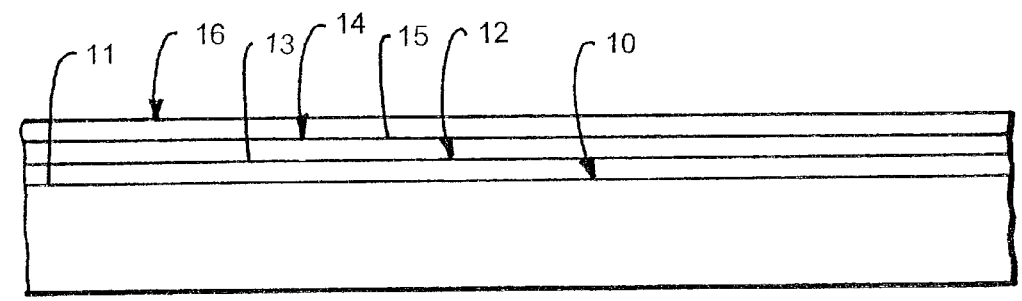

The next step is to apply a contiguous layer 16 of photoresist material on surface 15 of layer 14. The resulting structure is shown in FIG. 1D. The photoresist material may be either a positive or a negative photoresist material. A positive photoresist material is a material which upon exposure to radiation becomes soluble, whereby only the exposed portions of the photoresist material may be removed with a solvent. A negative photoresist material functions in an opposite manner.

Positive working photoresist suitable for purposes of the invention include two component systems comprising a light sensitive compound in a film forming polymeric binder, where the light sensitive component undergoes photochemical alteration upon exposure to radiation. The light sensitive compounds most frequently used in two component resist systems are esters and amides formed from o-quinone diazide sulfonic and carboxylic acids, especially from sulfonic acid esters of naphthoquinone diazides. These esters and amides are well known and described in the literature.

The polymer binders most frequently used for positive working photoresist in conjunction with o-quinone diazides are the alkali soluble phenol formaldehyde resins known as the novolak resins. Another class of binders used with o-quinone diazides are homopolymers and copolymers of vinyl phenol.

A specific example of a two component systems is a mixture of a novalak resin and a naphthoquinone diazide compound, in which the naphthoquinone diazide compound controls the alkali solubility of the novolak resin. Upon exposure to light, the naphthoquinone diazide compound becomes an indenecarboxylic acid and loses its control on alkali solubility. As a result, the resist in the exposed areas is rendered soluble in a developer such as an aqueous alkali solution. A number of commercially available positive photoresist of this type are known.

Single component photoresist comprise a polymer that undergoes chain scission. An example is a photoresist using a polyglutarimide polymer as a binder alone. Another known photoresist uses polymethylmethacrylate as a single component system. Polyester and polyketone resists that are single component positive resists are also known.

Other positive photoresists which may be used in accordance with the present invention include electrode depositable photoresists having salt-forming groups in the molecule such as amine, or carboxylic, sulphonic or phosphonic acid groups. Specific examples include the polyoxymethylene polymers, the o-nitrocarbinol esters, the o-nitrophenyl acetals, their polyesters, and end-capped derivatives, and benzo- and naphthoquinone diazide sulphonic esters.

Negative photoresists include photopolymerization type and photocrosslinking type photoresists. Photocrosslinking type photoresists undergo a crosslinking reaction on exposure to become insoluble in organic solvents or aqueous alkali solutions. Examples of negative photoresist of this type include cyclized rubber/bisazide systems containing cyclized rubber as a high-molecular weight component and a small amount of an aromatic bisazide compound as a photocrosslinking agent; and a phenolic resin/azide system containing an alkali-soluble phenolic resin and an aromatic azide compound.

The photoresist layer 16 may be applied using conventional techniques such as spin coating. After photoresist layer 16 has been applied over layer 14 of thermally crystallizable glass, the photoresist layer 16 is dried in accordance with an art recognized procedure.

Following formation of the dry photoresist layer 16, the next step involves imaging the dry photoresist layer. Imaging comprises exposure of the photoresist layer 16 to a source of actinic radiation through a mask having a desired image pattern. The required exposure dose is dependent upon the photoresist used. Radiation used for imaging photoresist layer 16 may have a wavelength of from about 200 to about 600 nanometers. Suitable sources of actinic radiation include carbon arcs, mercury vapor arcs, fluorescent lamps with phosphors emitting ultraviolet light, argon and xenon glow lamps, tungsten lamps, photographic flood lamps, etc. Of these, mercury vapor arcs, particularly sun lamps, fluorescent sun lamps, and metal halide lamps are most suitable. The time required for the exposure will depend upon a variety of factors which include, for example, the individual compounds used, the proportion of these compounds in the composition, the type of light source, and its distance from the composition. Suitable times may be readily determined by those familiar with photoimaging techniques.

The next step involves development of the exposed photoresist. As is known in the art, the object of the development step is to remove the exposed photoresist (positive) or unexposed (negative) regions of the exposed photoresist layer 16 at a faster rate than the background and in a reproducible and controlled manner. This is accomplished by contacting the photoresist coating with a developer. Development procedures and developer compositions are discussed in Semiconductor Lithography, Principles, Practices, and Materials, Plenum Press, New York, Chapter 10, 1988. Using diazo naphthoquinone-novolak positive acting photoresist for purposes of illustration, development is by contact with an aqueous alkaline developer solution such as an alkali metal hydroxide solution or a quaternary ammonium hydroxide solution. Developer strength and development time would be that required to remove (develop) the exposed portions of photoresist layer 16 to produce a desired pattern.

Figure 1E:
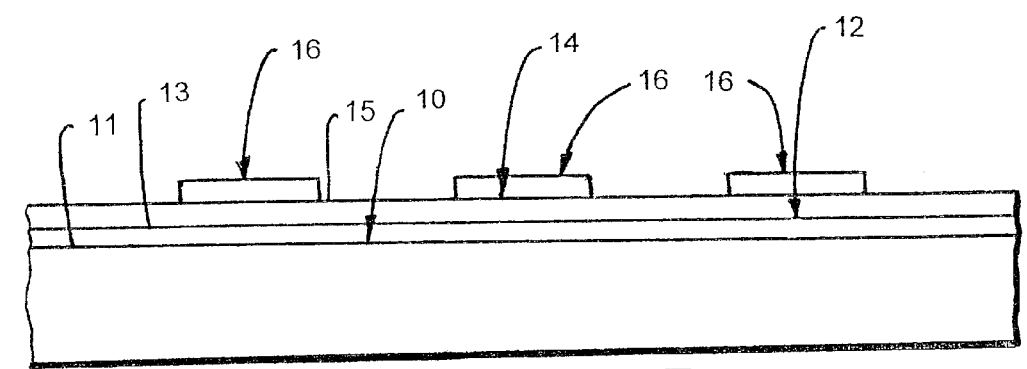

Developers for a negative photoresists include water, methanol, isopropanol, glycerol, diacetone alcohol, etc., dependent upon the particular negative photoresist used. As is known in the art, specific developers are used for specific photoresist systems. After development of the photoresist, a patterned photoresist layer remains, as shown in FIG. 1E. The patterned photoresist replicates the desired patterned glass for the waveguide core which will be subsequently formed.

Figure 1F:
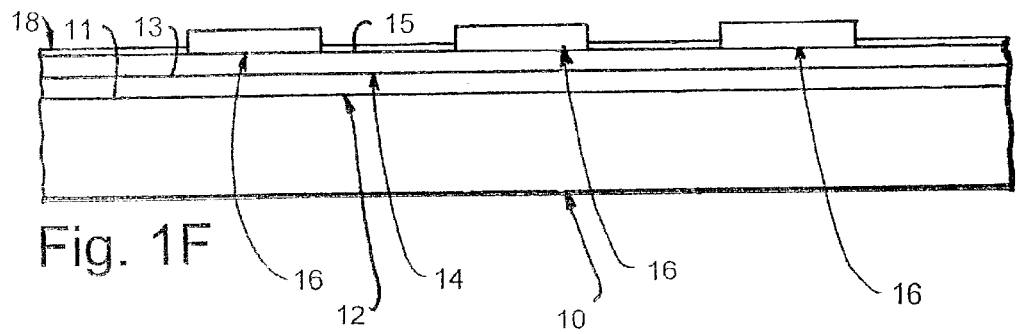

The next step is to deposit a seed layer 18 over the patterned resist layer 16 and the surface 15 of the thermally crystallizable glass layer 14 which is exposed through the patterned resist layer 16. The resulting structure (shown in FIG. 1F) includes a patterned seed layer 18 which contacts only those portions of the thermally crystallizable glass layer 14 which are exposed through the patterned resist layer 16. The seed layer 18 includes a nucleating agent. The expression "nucleating agent" as used herein refers to a material which promotes formation of a nucleus and subsequent growth of a crystal in the thermally crystallizable glass during an appropriate heat treatment. Thus, the expression "nucleating agent" as used herein encompasses photosensitive metals, such as gold, silver and copper, which, when exposed to ultraviolet light, form crystallization centers in the exposed regions, and, which during a subsequent heat treatment allow nucleation and growth of crystals in the thermally crystallizable glass. The expression is also meant to encompass colloidal particles, i.e., particles having dimensions in the range between about 1 nanometer and 1 micron, such as titanium oxide ($TiO_2$) colloidal particles.

Seed layer 18 may be deposited directly onto the exposed surfaces 15 of the thermally crystallizable layer 14, and incidentally on the patterned resist material 16, in the form of colloidal particles using known techniques such as PECVD, LPCVD, APCVD, FHD, or PVD.

After seed layer 18 has been deposited over the exposed surfaces 15 of thermally crystallizable glass layer 14, and incidentally over patterned resist layer 16, the patterned resist layer 16 may be removed with a resist stripper capable of dissolving the photoresist or releasing the photoresist from thermally crystallizable glass layer 14, but substantially incapable of dissolving or releasing seed layer 18 from the surface of thermally crystallizable glass layer 14. Resist strippers which can be used to remove a positive photoresist include an aqueous alkali solution containing a water-soluble solvent, such as N-methyl-2-pyrrolidinone, or an aqueous solution of an alkali, such as potassium hydroxide or sodium hydroxide. A positive photoresist layer may also be removed with an organic solvent, such as acetone or methylethylketone. Other known organic stripping compositions for removing a positive photoresist include compositions comprising phenol and linear alkyl benzene sulfonic acids, as exemplified in U.S. Pat. No. 3,871,929. Other known organic stripping compositions contain organic sulfonic acids of the formula $RSO_3H$, wherein R is an organic radical as disclosed in U.S. Pat. No. 4,165,295. Removal of the photoresist after development may take place after a further exposure to actinic radiation, or such further exposure may not be necessary. The removal may be effected using the same solvents or solutions as are used in the development stage, or more vigorous solvents, or stronger solutions may be used, or contact between the photoresist and the removing medium may be prolonged, in order to insure complete removal. The advantage of making a further, non-image-forming exposure is that milder conditions for removal of the photoresist may be employed, thus minimizing the risk of damage to patterned seed layer 18. Also, in the case of a negative photoresist, the unnecessary photoresist material that has been photocrosslinked or photopolymerized can be removed from glass layer 14 by treating with an organic solvent, such as acetone or methylethylketone.

Figure 1G:
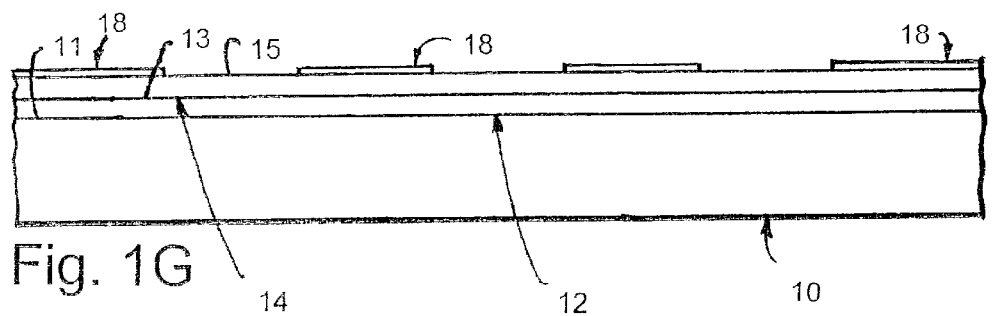

After the photoresist material has been removed, there remains a patterned seed layer 18 disposed on an upper surface of thermally crystallizable glass layer 14 as shown in FIG. 1G. As described below, those portions of the thermally crystallizable glass layer 14 which are covered by the patterned seed layer 18 will be converted to a crystalline material, while the remaining portions which are not covered by patterned seed layer 18 will remain in a glass state during and after a heat treating step.

After seed layer 18 has been deposited on the exposed surfaces 15 of thermally crystallizable glass layer 14, the seed layer is treated to initiate nucleation. This may involve exposing seed layer 18 to ultraviolet light in those cases wherein the nucleating agent is a photosensitive metal such as gold, silver or copper; or may involve heating the material, such as colloidal titanium oxide, to a temperature sufficient initiate nucleation. As one specific example, a suitable seed layer may be comprised of a photothermally crystallizable glass, such as the commercially available "FOTOFORM®" glass.

Next, oriented crystal growth through thermally crystallizable glass layer 14, in a direction from seed layer 18 through the thickness of layer 14, is promoted by an appropriate thermal treatment. In general, highly oriented crystal growth induced by surface nucleation at the interface between seed layer 18 and layer 14 is achieved by heating the assembly comprising substrate 10, undercladding 12, layer 14, patterned resist 16 and seed layer 18 at a temperature generally within the range extending from about 100° C. below the softening point (of about 600° C.) of glass layer 14 up to about 50° C. above the softening point. The heating time may range from about 5 minutes to about 6 hours depending on the temperature at which the material is treated. Although higher temperatures are preferred to reduce the time required for the heat treatment, lower temperatures may be desirable to reduce random nucleation within layer 14 and randomly oriented crystalline growth within layer 14. An appropriate heat treatment will depend on the particular material employed, and may be routinely determined.

During the heat treatment, highly directionally oriented needle-like crystals having a length oriented in the direction of the thickness of layer 14, and having sub-micron size dimensions transverse to the length of the crystals will form from those portions of layer 14 which are contacted with seed layer 18. The remaining portions will remain in a glass state.

Figure 1H:
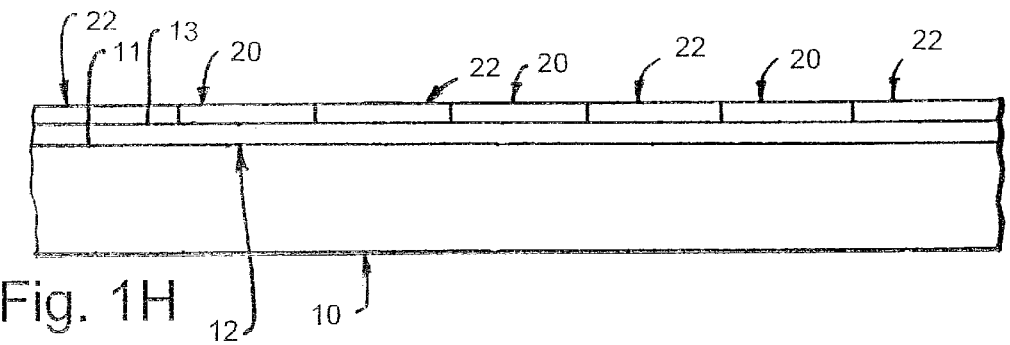
Figure 1:
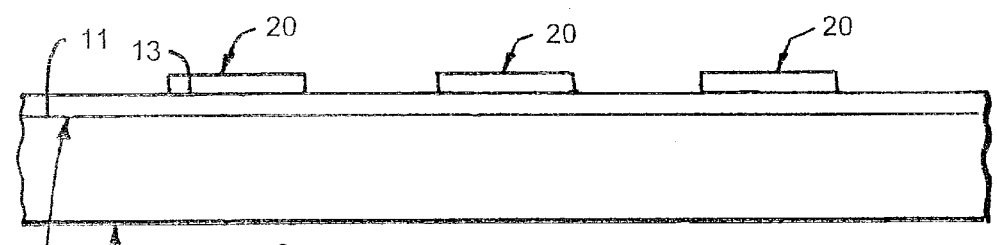
Figure 1:
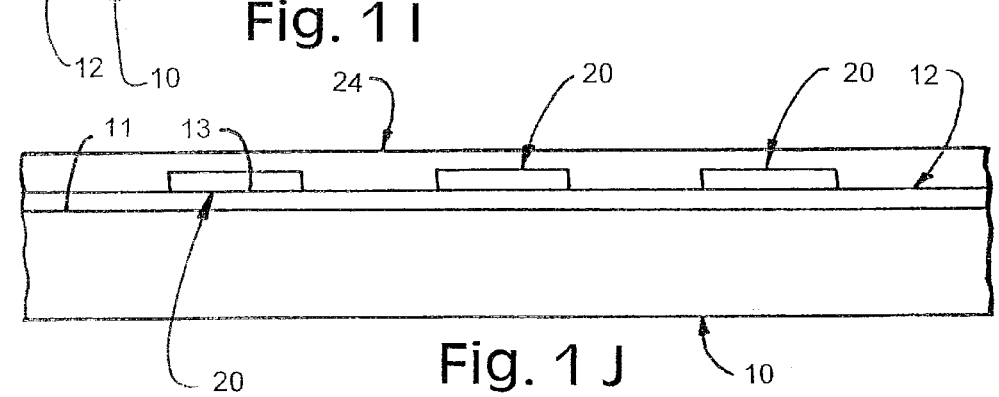

Accordingly, after the heat treatment, thermally crystallizable glass layer 14 will be converted into a layer comprised of a glass pattern, which may, for example, be comprised of one or more waveguide cores 20, surrounded by crystalline material 22, as shown in FIG. 1H.

After the heat treatment step has been completed and the desired portions of the thermally crystallizable glass layer 14 have been crystallized, the crystalline portions are removed by exposing layer 14 comprising patterned glass 20 and surrounding crystalline portions 22 with an etchant. A suitable and preferred etchant is hydrofluoric acid (HF). Because the crystalline material 22 is many times more soluble in hydrofluoric acid than patterned glass portions 20, crystalline portions 22 can be completely removed while patterned glass portions 20 remain substantially unaffected, or only very slightly affected. As a result, it is possible using the method described above to form very precisely defined glass patterns 20 having sidewalls which are substantially perpendicular with the major planar surface 13 of undercladding layer 12, e.g., sidewall angles which vary less than about 4° from being at a right angle with the major exposed planar surface 13 of undercladding layer 12.

The resulting patterned glass structure 20 formed on undercladding layer 12 attached to substrate 10 is shown in FIG. 1I. The minimum feature size of the patterned glass 20 is in the submicron range. Accordingly, the method facilitates relatively facile and inexpensive fabrication of a precisely defined submicron scale glass pattern which may be very advantageously employed in the production of a waveguide core pattern for an optical device.

After patterned glass 20 has been fabricated as described above, an overcladding layer 24 is deposited over patterned glass layer 20 and onto surface 13 of undercladding layer 12 so that the waveguide core defined by patterned glass portions 20 are completely surrounded by cladding material, i.e., undercladding layer 12 and overcladding layer 24 together completely envelop patterned glass portions 20. To permit patterned glass portions 20 to act as waveguide cores, undercladding layer 12 and overcladding layer 24 must have indices of refraction which are less than the index of refraction of patterned glass portions 20. The index of refraction of overcladding layer 24 may be the same as or different from the index of refraction of undercladding layer 12. Typically, the index of refraction of the undercladding and overcladding are each from about 0.5% to about 1% less than the index of refraction of the waveguide core. Because, unlike the undercladding, the overcladding need not be subjected to the high temperatures employed during thermal treatment of the thermally crystallizable glass layer 14, overcladding layer 24 may be comprised of a wider variety of materials. For example, overcladding layer 24 may be comprised of a glass material, a polymer material, a sol-gel material, or a sol-gel hybrid material. A glass overclad may be applied in any suitable manner, such as by PECVD, LPCVD, APCVD, FHD, or PVD. A sol-gel, sol-gel hybrid or polymer overclad may be applied by casting techniques, spin coating, dip coating or other suitable techniques. The completed optical device comprising waveguides 22, overcladding 24, undercladding 12 and substrate 10 is shown in FIG. 1J.

In addition to the possibility of employing either a negative photoresist or a positive photoresist, it is also possible to use image reversal or "lift-off" techniques. Such techniques are disclosed for example in U.S. Pat. No. 5,858,824.

Figure 2A:
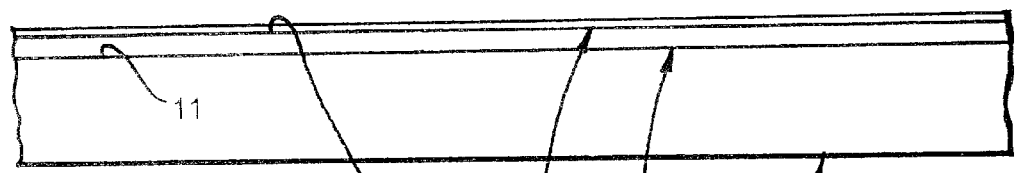
Figure 2B:
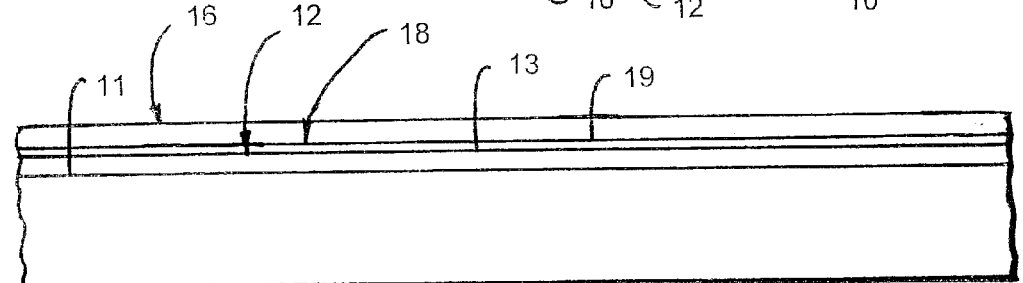
Figure 2C:
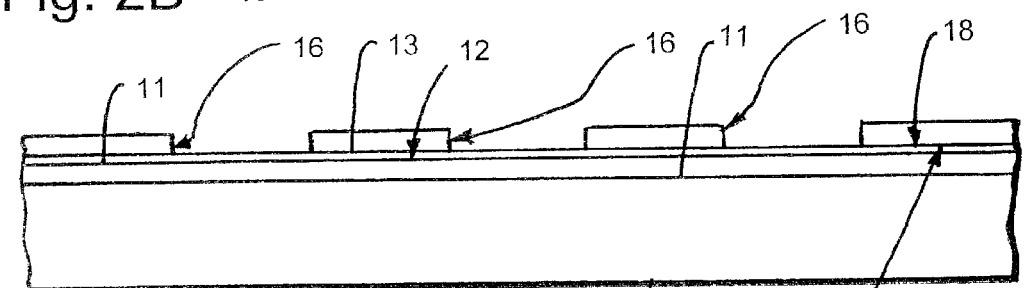
Figure 2D:
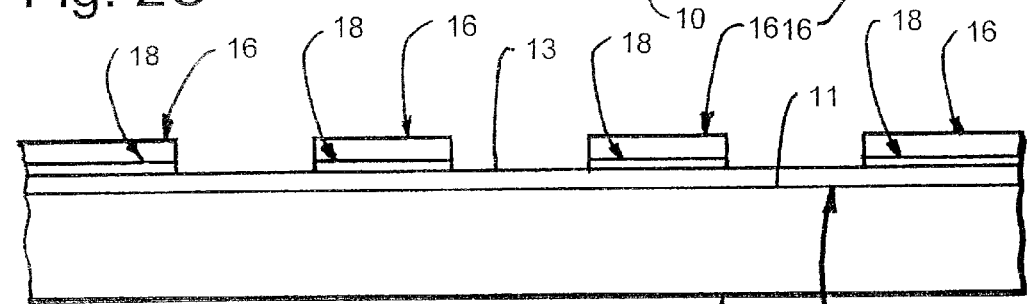
Figure 2E:
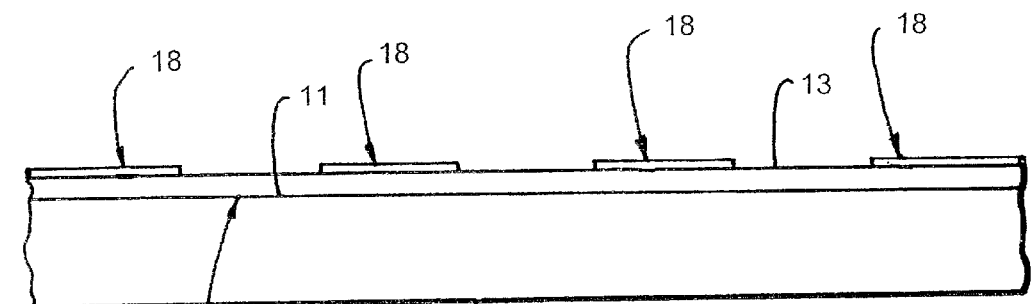

An alternative approach for producing the optical device shown in FIG. 1J is generally illustrated in FIGS. 2A through 2G. In accordance with this alternative approach, a contiguous seed layer 18 is deposited, as described above, directly onto surface 13 of an undercladding layer 12 of the structure such as shown in 1B to obtain the structure shown in FIG. 2A. Thereafter, a contiguous photoresist layer 16 is deposited on surface 19 of seed layer 18 to form the structure shown in FIG. 2B. Next, photoresist layer 16 is exposed to radiation and developed as described above with respect to the embodiment shown in FIGS. 1A–1J to achieve a patterned resist layer as shown in FIG. 2C, the patterned resist layer being a negative replica of the desired glass pattern. Next, surfaces 19 of seed layer 18 which are exposed through patterned photoresist layer 16 are etched out, such as with a plasma etching technique to remove the exposed sections of layer 18 resulting in the structure shown in FIG. 2D comprising substrate 10, undercladding layer 12, patterned seed layer 18, and patterned photoresist layer 16.

Thereafter, photoresist layer 16 may be removed using a conventional resist stripper as described above to obtain the structure shown in FIG. 2E comprising a patterned seed layer which is a negative replica of the desired glass pattern. Next, a thernally crystallizable glass layer 14 is deposited over the structure shown in FIG. 2E to obtain the structure shown in FIG. 2F in which sections of the thermally crystallizable layer 14 contact patterned seed layer 18, and in which other sections of thermally crystallizable glass layer 14 do not contact seed layer 18. The structure shown in FIG. 2F is subjected to heat treatment of the crystallizable glass layer 14 to achieve highly oriented growth in a direction from the seed layer through the thickness of the thermally crystallizable layer to form the structure shown in FIG. 2G comprising a patterned glass 20 surrounded by crystallized sections 22. The patterned glass corresponds with the pattern left after sections of seed layer 18 have been etched from cladding layer 12.

The crystalline sections 22 of the structure shown in FIG. 2G may be removed by etching, such as with hydrofluoric acid, as described above to obtain a structure substantially identical to the structure shown in FIG. 1I. Thereafter, an overcladding layer 24 can be deposited over the patterned glass to obtain a optical device having substantially the same structure shown in FIG. 1J.

In accordance with the methods of this invention, seed layer 18 is a relatively thin film which may contain a photothermal nucleating agent or a thermal nucleating agent. For example, seed layer 18 may be formed by using a commercially available photothermally crystallizable glass material (e.g., "FOTOFORM") which may be applied using techniques such as chemical vapor deposition or physical vapor deposition, and subsequently exposing the photothermally crystallizable glass to UV radiation, and heat treating the material to cause nucleation and initiation of crystalline growth at the interface between the seed layer and the thermally crystallizable glass layer 14. In some cases, it may be desirable to use a heating schedule in which the seed layer 18 and crystallizable glass layer 14 are heated to a relatively high temperature (e.g., about the softening temperature of the thermally crystallizable glass) for a period of time which is effective to initiate nucleation in the seed layer, and subsequently heat treated at a relatively lower temperature (e.g., about 50° C. to about 100° C. below the softening temperature of the thermally crystallizable glass) which promotes crystalline growth but inhibits further nucleation. The result is highly oriented crystalline growth through the thermally crystallizable glass layer of needle-like crystals having a maximum dimension transverse to the direction of crystalline growth (i.e., the thickness direction of the thermally crystallizable glass layer 14) which is in the submicron range. Because the minimum feature size of the patterned glass is controlled by the maximum transverse dimension of the crystals formed in layer 14, the minimum feature size of the resulting patterned glass 20 is also in the submicron range. The methods of this invention which utilize controlled surface nucleation may be employed to produce patterned glass 20 having a very high aspect ratio (i.e., the ratio of the height to the width of, for example, a waveguide core).

The seed layers 18 may also be formed such as by uniformly depositing colloidal particles on the surface of layer 14 using chemical vapor deposition or physical vapor deposition techniques, or by depositing an aqueous solution containing a metal oxide (e.g., $TiO_2$) which is precipitated to form a thin metal oxide film as described above.

It will become apparent to those skilled in the art that various modifications to the preferred embodiment of the invention as described herein can be made without departing from the spirit or scope of the invention as defined by the appended claims.

What is claimed is:

1. A method of patterning a layer of glass on a substrate, comprising:

depositing a layer of thermally crystallizable glass on the substrate;
      forming a pattern of seed material, the seed material including a nucleating agent and being positioned adjacent a surface of the layer of thermally crystallizable glass;

inducing crystal nucleation in the seed material;
      heat treating the seed material and the layer of thermally crystallizable glass to induce crystal growth from the seed material through a thickness of the adjacent layer of thermally crystallizable glass at selected portions of the layer of thermally crystallizable glass which are adjacent the pattern of seed material to convert the layer of thermally crystallizable glass to a desired pattern of glass surrounded by crystalline material; and selectively etching the crystalline material from the substrate while leaving the desired pattern of glass substantially unaffected by the etching.

2. The method of claim 1, wherein the layer of thermally crystallizable glass is deposited directly on a surface of the substrate, and thereafter the pattern of seed material is formed on the layer of thermally crystallizable glass.

3. The method of claim 2, wherein the pattern of seed material is formed by the steps of:

depositing a contiguous layer of a photoresist material over the layer of thermally crystallizable glass;

exposing the photoresist material to actinic radiation through a patterned mask to render a portion of the photoresist material soluble to a developer solvent and another portion of the photoresist material insoluble to the developer solvent;

applying the developer solvent to the photoresist material to remove the soluble portion of the photoresist material to leave an insoluble patterned photoresist material on the layer of thermally crystallizable glass; and depositing seed material onto the portion of the thermally crystallizable glass which is exposed through the patterned photoresist material.

4. The method of claim 3, wherein the seed material contains a photosensitive metal which when exposed to ultraviolet light and subsequently heat treated forms nuclei for crystallization of the thermally crystallizable glass.

5. The method of claim 4, wherein crystal nucleation is induced in the seed material by exposure of the seed material to ultraviolet light and subsequent heat treatment.

6. The method of claim 1, wherein the pattern of seed material is formed directly on a surface of the substrate, and the layer of thermally crystallizable glass is deposited over the pattern of seed material.

7. The method of claim 6, wherein the pattern of seed material is formed by the steps of:

depositing a contiguous layer of seed material directly on a surface of the substrate;

depositing a contiguous layer of a photoresist material over the contiguous layer of seed material;

exposing the photoresist material to actinic radiation through a patterned mask to render a portion of the photoresist material soluble to a developer solvent and another portion of the photoresist material insoluble to the developer solvent;

applying the developer solvent to the photoresist material to remove the soluble portion of the photoresist material and leave an insoluble patterned photoresist material on the layer of the seed material; and etching away a portion of the seed material which is exposed through the patterned photoresist material.

8. The method of claim 7, wherein the seed material contains a photosensitive metal which when exposed to ultraviolet light and subsequently heat treated forms nuclei for crystallization of the thermally crystallizable glass.

9. The method of claim 8, wherein crystal nucleation is induced in the seed material by exposure of the seed material to ultraviolet light and subsequent heat treatment.

10. The method of claim 1, wherein the substrate is an undercladding having an index of refraction less than the index of refraction of the pattern of glass, and wherein the pattern of glass and a portion of the surface of the undercladding exposed through the pattern of glass are covered with an overcladding having an index of refraction less than the index of refraction of the pattern of glass, whereby the pattern of glass defines an optical waveguide core.

* * * * *

UNITED STATES PATENT AND TRADEMARK OFFICE
CERTIFICATE OF CORRECTION

PATENT NO. : 6,403,286 B1
DATED : June 11, 2002
INVENTOR(S) : Robert A. Bellam et al.

It is certified that error appears in the above-identified patent and that said Letters Patent is hereby corrected as shown below:

<u>Title page,</u>
Item [57], ABSTRACT,
Lines 4 and 8, "heart" should be -- heat --.

<u>Column 3,</u>
Line 19, "include" should be -- includes --.
Line 32, delete "that".

<u>Column 4,</u>
Line 7, after "photoresist" insert -- materials --.
Line 24, "systems" should be -- system --.
Line 25, "novalak" should be -- novolak --.
Lines 33, 34 and 35 "photoresist" should be -- photoresists --.

<u>Column 6,</u>
Line 57, after "sufficient" insert -- to --.

<u>Column 7,</u>
Line 16, "sub-micron" should be -- submicron --.

<u>Column 8,</u>
Line 60, "11" should be -- 1I --.

<u>Column 9,</u>
Line 2, "FOTOFORM" should be -- FOTOFORM® --.

Signed and Sealed this

Eighth Day of April, 2003

JAMES E. ROGAN
*Director of the United States Patent and Trademark Office*